Sept. 25, 1962 W. S. BACHMAN ET AL 3,055,989

CERAMIC REPRODUCER

Filed Aug. 12, 1957

2 Sheets-Sheet 1

INVENTORS
WILLIAM S. BACHMAN
LOUIS R. PORRATA
BY
Brumbaugh, Free, Graves & Donohue
THEIR ATTORNEYS Sept. 25, 1962 W. S. BACHMAN ET AL 3,055,989

CERAMIC REPRODUCER

Filed Aug. 12, 1957

2 Sheets-Sheet 2

INVENTORS
WILLIAM S. BACHMAN
LOUIS R. PORRATA
BY
Brumbaugh, Free, Graves & Donohue
THEIR ATTORNEYS United States Patent Office 3,055,989
Patented Sept. 25, 1962

3,055,989

CERAMIC REPRODUCER

William S. Bachman, Southport, Conn., and Louis R. Porrata, Cliffside Park, N.J., assignors to Columbia Broadcasting System, Inc., New York, N.Y., a corporation of New York Filed Aug. 12, 1957, Ser. No. 677,610
17 Claims. (Cl. 179—100.41)

The present invention relates to electro-mechanical transducers and more particularly to piezo-electric phonograph pickup devices capable of providing electric signals in response to the modulation in a grooved record.

The piezo-electric pickups available heretofore have not been entirely satisfactory, mainly because some form of spring coupling has usually been used between the stylus tip and the piezo-electric element. There are two serious disadvantages in this practice. First, it introduces lost motion which reduces the efficiency of the device. Secondly, it leaves the transducer element free to vibrate in one or more undesirable modes which fall well within the frequency band being reproduced. As a result, elaborate damping means must be provided to insure that the device will have a satisfactory response characteristic.

It is an object of the invention to provide new and improved electromechanical transducer apparatus of the above character which is free from the above-noted deficiencies of the prior art.

A further object of the invention is to provide new and improved electromechanical transducer apparatus of the above character which permits a controlled design choice to be made between compliance at the stylus tip and electrical output.

Another object of the invention is to provide new and improved electromechanical transducer apparatus of the above character which is responsive to vertical stimulation as provided by so-called "hill and dale" records.

A still further object of the invention is to provide new and improved electromechanical transducer apparatus of the above character which is responsive to both modulation tracks in a double modulated groove record.

These and other objects of the invention are attained by clamping a bar of piezo-electric material at one end and driving it at a location spaced from that end by one lever arm of a bell crank mechanism carrying a stylus on the other lever arm thereof. The bar is maintained continuously engaged with the other arm of the bell crank by resilient means. Further, the stylus, the pivot point of the bell crank, and the point of contact between the bell crank arm and the bar are all disposed in the same plane. As a result, the device responds to stimulation in one direction only and it is restrained from vibration in any undesired modes. Also, by proper design of the bell crank lever arms, a controlled design choice between compliance at the stylus tip and electrical output can be made.

The invention also contemplates the provision of a pickup device designed for use with double modulated groove records. It comprises, for example, two of the pickup devices described above mounted in angularly spaced relation, with the driving arm of the bell crank of each connected for actuation by a common stylus lying in a plane bisecting the angle between the two pickup devices.

In an alternate embodiment of a pickup device designed for use with double modulated groove records, the two pickup devices are mounted in parallel spaced relation, with the driving arm of the bell crank of each in angularly spaced relation and connected for actuation by a common stylus lying in a plane bisecting the angle between the bell crank driving arms.

Additional objects and advantages of the invention will become apparent from the following detailed description of several representative embodiments thereof, taken in conjunction with the accompanying drawings in which.

Figure 1:
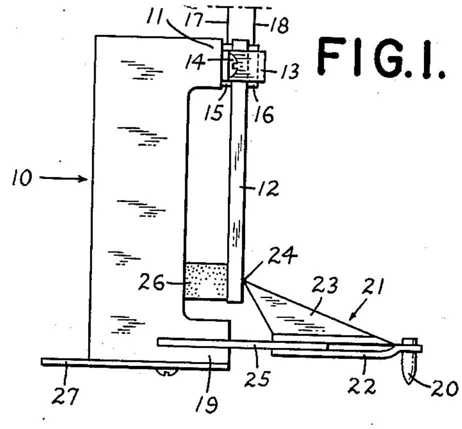
FIG. 1 is a side view in elevation of a piezo-electric transducer constructed according to the invention for use with so-called "hill and dale" records.
Figure 2:
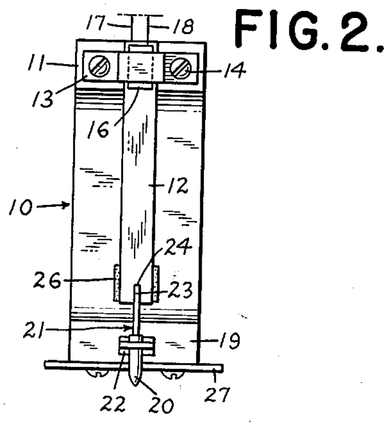
FIG. 2 is a front view in elevation of the piezo-electric transducer shown in FIG. 1.

While the invention may be applied equally well to pickups designed for response to either lateral or vertical stimulation, it has been shown in FIG. 1 as applied to a typical pickup responsive to vertical stimulation of the stylus.

Referring now to FIG. 1, the pickup comprises a substantially U-shaped frame 10 to the arm 11 of which is secured by a clamp 13 and screws 14 one end of a piezo-electric ceramic bar 12 of any known type capable of providing an electrical signal in response to displacement of the free end thereof. Preferably, the bar 12 is rectangular in cross-section. The bar 12 is provided with the usual electrodes 15 and 16 on opposite sides thereof which are connected to output leads 17 and 18, respectively, and it extends to a point just short of the lower arm 19 of the frame 10.

The ceramic bar 12 is adapted to be driven by a conventional stylus 20 through a bell crank mechanism 21. Thus, the stylus 20 is mounted at the free end of a sleeve-like member 22 having a lever arm 23 terminating in a point contact 24 at the free end of the ceramic bar 12. The sleeve-like member 22 is secured in any suitable manner at one end of a wire spring 25, the other end of which is embedded in or otherwise secured to the arm 19 of the frame 10. The wire spring 25 serves as a hinge or pivot for the bell crank mechanism 21. The free end of the ceramic bar 12 is maintained continuously engaged with the lever arm 23 at the point of contact 24 by a resilient member 26 such as a pad of soft rubber, for example. The complete pickup assembly, as shown in FIG. 1, is adapted to be secured to the usual tone arm (not shown) in any suitable manner as by a plate 27 secured to the underside of the frame 10, as shown in FIG. 1.

In operation, and with the pickup assembly of FIG. 1 mounted in a conventional tone arm (not shown), the stylus 20 is placed in an intial groove of a so-called "hill and dale" record so that vertical stimulation is applied to the stylus 20 by the modulation in the record groove. This causes the bell crank comprising the sleeve-like member 22, the lever arm 23 and the spring wire 25 to pivot about a point between the rear end of the sleeve-like member 22 and the arm 19 of the frame 10. This applies a driving force to the free end of the ceramic bar 12 at the point of contact 24 against the restoring force of the resilient member 26, causing the ceramic bar 12 to vibrate laterally in accordance with the up and down stimulation applied to the stylus 20.

Since the ceramic bar 12 is kept in continuous engagement with the lever arm 23 at the point of contact 24, and is clamped at its opposite end, it is restrained from vibration in any undesired modes. Further, it will be noted that any lateral stimulation of the stylus (in a direction perpendicular to the paper in FIG. 1) causes the bell crank to pivot about the point of contact 24, resulting in no drive of the ceramic bar 12. In other words, such stimulation does not apply any twisting or translatory motion to the ceramic bar 12. Hence, when the pickup is on a double modulated groove record having separate vertically and laterally cut channels, it will respond to the vertically cut channel to the complete exclusion of the laterally cut channel, thereby effecting excellent separation between the two channels.

Figure 3:
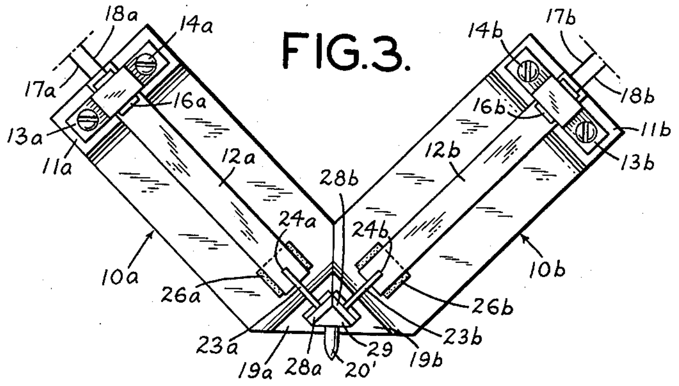
FIG. 3 is a front view, in elevation, of another form of piezo-electric transducer according to the invention, adapted to respond to the different modulation channels of a double modulated groove record.
Figure 4:
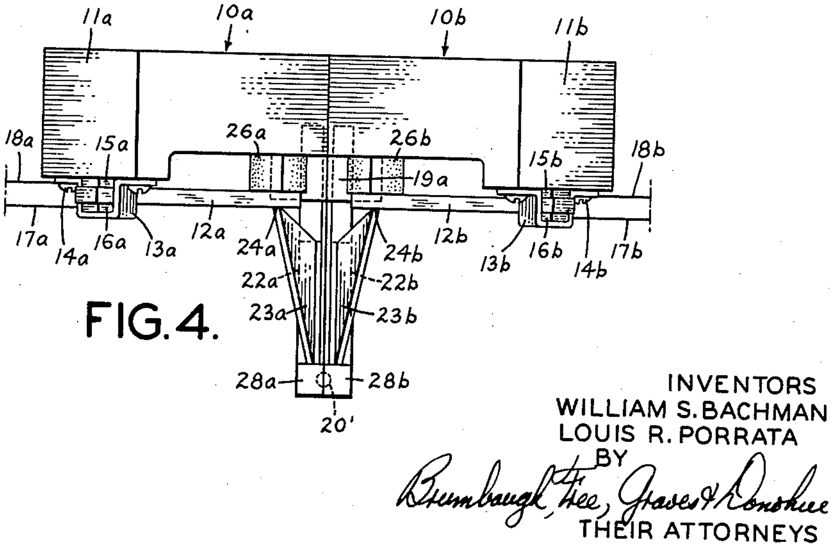
FIG. 4 is a plan view of the device shown in FIG. 3.

In FIGS. 3 and 4 is shown a modified form of pickup device which enables separate responses to be obtained from both of the modulation channels in a double modulated groove record. Basically, the pickup comprises two pickup components of the type shown in FIG. 1 disposed substantially 90° apart and connected to respond to a common stylus lying in a plane bisecting the angle between the two assemblies. Thus, in FIGS. 3 and 4, the pickup comprises two frame components 10*a* and 10*b* secured together substantially at an angle of 90° and having ceramic bars 12*a* and 12*b* secured thereon substantially in the same manner as shown in FIG. 1.

However, as best shown in FIG. 4, the free ends of the sleeve members 22*a* and 22*b* are secured to the mutually perpendicular faces 28*a* and 28*b* of a light triangular prism-shaped element 29 to the underside of which is secured the stylus 20′. Otherwise, the two component assemblies comprising the pickup shown in FIGS. 3 and 4 are essentially the same as that shown in FIG. 1.

If the pickup device shown in FIGS. 3 and 4 is used to play back a double modulated groove record containing two modulation channels cut mutually perpendicular to one another and at an angle of 45° to the face of the record, it will provide an electrical output at the conductors 17*a* and 18*a* representative of the modulation in one channel, and a second electrical output at the conductors 17*b* and 18*b* representative of the modulation in the other channel. The ceramic bar 12*a* will be responsive only to the component of the stimulation imparted to the stylus 20′ in a plane containing the lever arm 23*a*, the point of contact 24*a* and the spring wire 25 and it will be wholly unresponsive to any other component of motion applied to the stylus 20′. Similarly, the ceramic bar 12*b* will be responsive only to the component of the stimulation imparted to the stylus 20′ lying in a plane containing the lever arm 23*b*, the point of contact 24*b* and the spring wire 25. Hence, the pickup device enables separate indications to be obtained of the two modulation channels in a double modulated groove record with excellent separation between the two channels.

Figure 5:
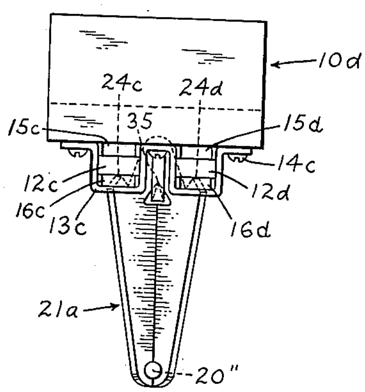
FIG. 5 is a plan view of an alternate embodiment of piezo-electric transducer adapted to respond to the different modulation channels of a double modulated groove record, in accordance with the invention.
Figure 6:
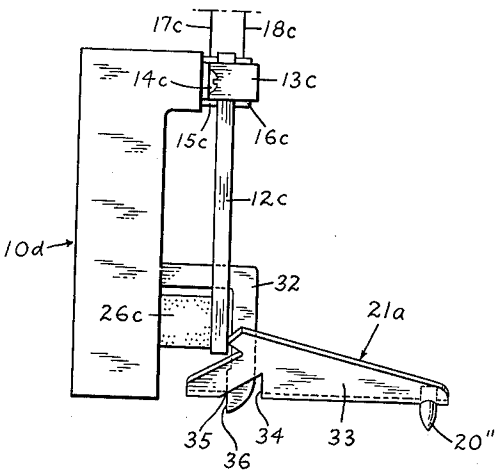
FIG. 6 is a side view of the device shown in FIG. 5.
Figure 7:
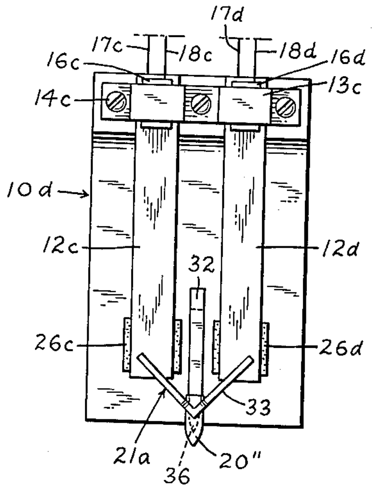
FIG. 7 is a front view in elevation, of the device shown in FIG. 5.

In the alternate embodiments of FIGS. 5, 6 and 7, the pickup device comprises two pickup components of the type generally shown in the modification of FIGS. 3 and 4, but differing therefrom in that the ceramic bars 12*c* and 12*d* are disposed in spaced-apart parallel relation and are connected to respond to a common stylus 20″ lying in a plane passing between the ceramic bars 12*c* and 12*d* and bisecting the angle between the two lever sections of a bell crank mechanism 21*a*. The two ceramic bars 12*c* and 12*d* are secured by means of a double U-shaped clamp 13*c* and screws 14*c* to a frame 10*d*.

Instead of employing a wire spring as a hinge or pivot for the bell crank mechanism, the mechanism 21*a* uses a knife-edge pivot arrangement comprising a knife-edge element 32 and a V-shaped support member 33 to which the stylus 20″ is secured. The support member 33 is adapted to lie substantially perpendicularly to the ceramic bars 12*c* and 12*d* and have an aperture 34 rearwardly disposed therein. Two sides of the aperture 34 extend rearwardly and intersect to form an angle, the apex 35 of which lies in the apex line of the support member 33. A vertically disposed portion of the knife-edge element 32 passes through the aperture 34 of the separating member 33 in such a way that the knife-edge 36 thereof engages the apex 35 to form a pivot point for the bell crank mechanism 21*a*. The knife-edge element 32 is fixedly connected to the frame 10*d* in any suitable manner. Each side of the V-shaped supporting member 33 forms a lever arm between the pivot point at apex 35 for the stylus 20″ in fixed angular relation to a lever arm extending between the pivot point at the apex 35 and respective points of contact 24*c* and 24*d* with the ceramic bars 12*c* and 12*d*. The free ends of the ceramic bars 12*c* and 12*d* are maintained in continuous engagement with the supporting member 33 at the points of contact 24*c* and 24*d* by respective resilient members 26*c* and 26*d*. Contact may be maintained between the knife-edge element 32 and the supporting member 33 at the point 35 by any suitable means such as a small bubble of flexible rubber cement, for example. The double modulation pick up device of FIGS. 5, 6 and 7 operate in substantially the same manner as that disclosed in FIGS. 3 and 4.

The invention thus provides novel and highly effective phonograph pickup apparatus for reproducing sound from a grooved phonograph record. By clamping one end of a bar of piezo-electric material and driving its other end from a stylus through a bell crank mechanism, and providing resilient means to maintain the free end of the bar in continuous engagement with the bell crank mechanism, the bar is restrained from vibration in undesired modes. Hence, there is no need for elaborate damping means to secure a desired frequency response, as is required in substantially all conventional designs at the present time. Further, the provision of bell crank mechanism is to drive the piezo-electric element enables a controlled design choice to be made between the compliance at the stylus tip and the electrical output.

While several specific pickups embodying the invention have been described herein and are illustrated in the drawings, it will be understood that the invention is not limited thereto. For example, the invention may be applied equally to pickups designed to respond to lateral stimulation provided by a grooved record. This might be accomplished by turning the pickup of FIG. 1 on its side and mounting the stylus 20 at right angles to the plane containing the lever arm 23. Also, the two pickup components of the device shown in FIGS. 3 and 4 may be disposed at other angular spacings than 90°, depending on the characteristics of the specific double modulated groove record with which they are to be used.

Further the bell crank mechanism of the various embodiments may be detachably connected to the frame to which the bar of piezo-electric material is secured by suitable clip means, for example, to which the pivot means of the mechanism is coupled, thereby providing a replaceable stylus.

Other modifications will be readily apparent to those skilled in the art. The invention, therefore, is not to be restricted to the specific structures shown but comprehends all modifications thereof coming with the scope of the appended claims.

We claim:

1. In electromechanical transducer apparatus, the combination of electromechanical transducer means having a displaceable portion and adapted to provide an electrical signal in response to displacement of said displaceable portion, lever means having one rigid arm mechanically coupled directly to said transducer means displaceable portion by point engagement therewith to prevent vibration thereof in undesired modes and another arm adapted to receive mechanical stimulation to drive said transducer means displaceable portion, and resilient means maintaining said transducer means displaceable portion continuously mechanically coupled to said one arm.

2. In electromechanical transducer apparatus the combination of a bar of piezo-electric material fixed at one end and displaceable at its other end, lever means having one rigid arm mechanically coupled directly to said bar at a location spaced from said fixed end by point engagement therewith to prevent vibration thereof in undesired modes and having another arm adapted to receive mechanical stimulation to drive said bar, and resilient means maintaining said one arm continuously mechanically coupled to said bar.

3. In electromechanical transducer apparatus, the combination of a piezo-electric transducer bar fixed at one end and displaceable at its other end, pivotally mounted lever means having one rigid arm in mechanical point engagement with said bar at a location spaced from said fixed end to prevent vibration thereof in undesired modes and a second arm carrying a stylus adapted to receive mechanical stimulation to drive said bar, and resilient means maintaining said one arm continuously in mechanical point engagement with said bar.

4. In electromechanical transducer apparatus, the combination of a piezo-electric transducer bar fixed at one end and displaceable at its other end, pivotally mounted lever means having one rigid arm in mechanical point engagement with said bar at a location spaced from said fixed end to prevent vibration thereof in undesired modes and a second arm carrying a stylus adapted to receive mechanical stimulation to drive said bar, said lever means having a pivot point lying in a common plane with said stylus and said point of engagement of said one arm with said bar, and resilient means maintaining said one arm continuously in mechanical point engagement with said bar.

5. In phonograph pickup apparatus, the combination of a frame, a piezo-electric transducer bar fixed at one end to said frame and displaceable at its other end, lever means comprising spring wire means positioned in fixed relation to said frame in the vicinity of the displaceable end of said bar and having one rigid lever arm in mechanical point engagement with said bar at a location spaced from the fixed end thereof to prevent vibration thereof in undesired modes and a second lever arm carrying a stylus adapted to receive mechanical stimulation to drive said bar, said spring wire means, stylus and the point of engagement of said bar with said one lever arm lying in a common plane.

6. In phonograph pickup apparatus for use with double modulated groove records, the combination of spaced apart electromechanical transducer means each having a displaceable portion and each adapted to provide an electrical signal in response to displacement of said displaceable portion, a plurality of lever means having first rigid arms angularly spaced apart and mechanically coupled respectively, directly to said transducer means displaceable portions by point engagement therewith to prevent vibration thereof in undesired modes, and second arms mechanically coupled to receive mechanical stimulation to drive said respective transducer means displaceable portions, and a plurality of resilient means respectively maintaining said transducer means displaceable portions continuously mechanically coupled to said first arms, respectively, of said lever means.

7. In phonograph pickup apparatus for use with double modulated groove records, the combination of electromechanical transducer means in spaced apart parallel relation each having a displaceable portion and each adapted to provide an electrical signal in response to displacement of said displaceable portion, a plurality of lever means having first rigid arms angularly spaced apart and mechanically coupled, respectively, directly to said transducer means displaceable portions by point engagement therewith to prevent vibration thereof in undesired modes, and second arms mechanically coupled to receive mechanical stimulation to drive said respective transducer means displaceable portions, and a plurality of resilient means respectively maintaining said transducer means displaceable portions continuously mechanically coupled to said first arms, respectively, of said lever means.

8. In phonograph pickup apparatus for use with double modulated groove records, the combination of angularly spaced apart electromechanical transducer means each having a displaceable portion and each adapted to provide an electrical signal in response to displacement of said displaceable portion, a plurality of lever means having first rigid arms mechanically coupled, respectively, directly to said transducer means displaceable portions by point engagement therewith to prevent vibration thereof in undesired modes, and second arms mechanically coupled to receive mechanical stimulation to drive said respective transducer means displaceable portions, and a plurality of resilient means respectively maintaining said transducer means displaceable portions continuously mechanically coupled to said first arms, respectively, of said lever means.

9. In electromechanical transducer apparatus for use with double modulated groove records, the combination of first and second bars of piezo-electric material mounted in spaced apart relation to one another, each being fixed at one end and displaceable at its other end, first lever means having one rigid arm mechanically coupled directly to one of said bars at a location spaced from the fixed end thereof by point engagement therewith to prevent vibration thereof in undesired modes and having another arm adapted to receive mechanical stimulation to drive said one bar, second lever means having one rigid arm mechanically coupled to the other of said bars at a location spaced from the fixed end thereof by point engagement therewith to prevent vibration thereof in undesired modes and having another arm mechanically coupled to said first lever means another arm to receive mechanical stimulation therewith to drive said other bar, said first arm of each of said first and second lever means being relatively angularly displaced, and resilient means maintaining said respective bars continuously mechanically coupled to its lever means driving arm.

10. In electromechanical transducer apparatus for use with double modulated groove records, the combination of first and second bars of piezo-electric material mounted in spaced apart substantially parallel relation to one another, each being fixed at one end and displaceable at its other end, first lever means having one rigid arm mechanically coupled directly to one of said bars at a location spaced from the fixed end thereof by point engagement therewith to prevent vibration thereof in undesired modes and having another arm adapted to receive mechanical stimulation to drive said one bar, second lever means having one rigid arm mechanically coupled to the other of said bars at a location spaced from the fixed end thereof by point engagement therewith to prevent vibration thereof in undesired modes and having another arm mechanically coupled to said first lever means another arm to receive mechanical stimulation therewith to drive said other bar, said one arm of each of said first and second lever means being relatively angularly displaced, and resilient means maintaining said respective bars continuously mechanically coupled to its lever means driving arm.

11. In electromechanical transducer apparatus for use with double modulated groove records, the combination of first and second bars of piezo-electric material mounted substantially at right angles to one another, each being fixed at one end and displaceable at its other end, first lever means having one rigid arm mechanically coupled directly to one of said bars at a location spaced from the fixed end thereof by point engagement therewith to prevent vibration thereof in undesired modes and having another arm adapted to receive mechanical stimulation to drive said one bar, second lever means having one rigid arm mechanically coupled to the other of said bars at a location spaced from the fixed end thereof by point engagement therewith to prevent vibration thereof in undesired modes and having another arm mechanically coupled to said first lever means another arm to receive mechanical stimulation therewith to drive said other bar, and resilient means maintaining said respective bars continuously mechanically coupled to its lever means driving arm.

12. In electromechanical transducer apparatus for use with double modulated groove records, the combination of first and second piezo-electric transducer bars mounted in spaced apart relation and each fixed at one end and displaceable at the other end, first and second lever means having first lever arms relatively angularly displaced and in point mechanical contact with said respective bars at locations spaced from the fixed ends thereof to prevent vibration thereof in undesired modes, respectively, and having second lever arms, first and second resilient means for maintaining said first and second transducer bars continuously in mechanical engagement with said respective first lever arms, and stylus means lying in a plane bisecting the angle between said first lever arm of said first and second lever means connected in common to said second lever arms to drive said respective bars.

13. Electromechanical transducer apparatus as in claim 12, in which the stylus means, the pivot point for the first lever means and the point of contact of the first lever arm of the latter with the corresponding bar lie in a first common plane, while the stylus means, the pivot point for the second lever means and the point of contact of the first lever arm of the latter with the corresponding bar lie in a second common plane at right angles to said first common plane.

14. Electromechanical transducer apparatus as in claim 12, in which the first and second piezo-electric transducer bars are mounted in spaced apart parallel relation.

15. Electromechanical transducer apparatus as in claim 12, in which the first and second piezo-electric transducer bars are mounted in mutually perpendicular relation.

16. A stylus device for use in electromechanical transducer apparatus comprising lever means having first and second rigid arms disposed at an angle, stylus means mounted on the first arm to receive mechanical stimulation to drive said lever means, and a pointed portion projecting from said second arm to engage an electromechanical transducer by point contact therewith to prevent vibration thereof in undesired modes.

17. A stylus device according to claim 16 including resilient lever support means extending from a point adjacent to the junction between the two lever arms to permit angular motion of the lever means in the plane of the two arms.

References Cited in the file of this patent

UNITED STATES PATENTS

| | | |
|---|---|---|
| 1,821,836 | Hull | Sept. 1, 1931 |
| 1,980,888 | Thomas | Nov. 13, 1934 |
| 2,093,540 | Blumlein | Sept. 21, 1937 |
| 2,114,471 | Keller | Apr. 19, 1938 |
| 2,207,539 | Gravley | July 9, 1940 |
| 2,849,239 | Dieter | Aug. 26, 1958 |
| 2,856,465 | Morrell et al. | Oct. 14, 1958 |

FOREIGN PATENTS

| | | |
|---|---|---|
| 158,364 | Australia | Dec. 20, 1951 |